(No Model.)

F. D. KERNOCHAN.
THILL COUPLING.

No. 321,036. Patented June 30, 1885.

Witnesses:

Inventor:
Frank D. Kernochan

UNITED STATES PATENT OFFICE.

FRANK D. KERNOCHAN, OF MIDDLETOWN, NEW YORK.

THILL-COUPLING.

SPECIFICATION forming part of Letters Patent No. 321,036, dated June 30, 1885.

Application filed February 13, 1883. (No model.)

*To all whom it may concern:*

Be it known that I, FRANK D. KERNOCHAN, of Middletown, in the county of Orange and State of New York, have invented a new and useful improvement in elastic tighteners for thill or shaft couplings or bolts, joints or connections, by which rattling is prevented and the fastening made more firm and secure, of which the following is a specification.

My improvement has for its object to secure in a simple and reliable manner, by means of tension obtained and applied as hereinafter described, the coupling bolt or pin of wagon thills, poles or shafts, hinges, and other similar devices by which movable articles are attached to stationary ones, whereby the bolt or pin is permitted to perform its function without rattle, noise, or unnecessary play. To accomplish this object heretofore, rubber and other elastic substances have been used, but with only temporary success, as the elasticity, by reason of the constant pressure upon the device used, is soon lost.

Figure 1:
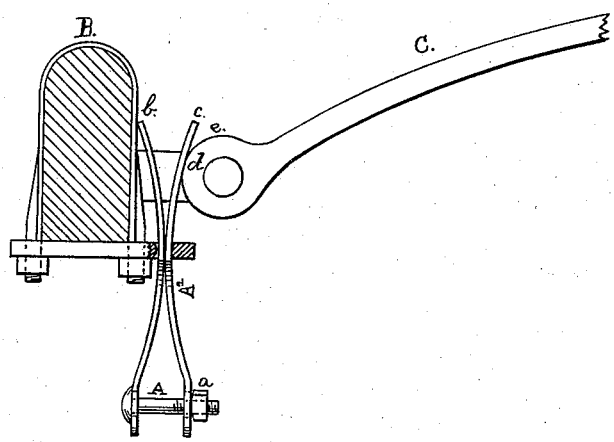

My invention consists of one or more pieces of spring-steel shaped in elliptic or other suitable form, and operated when in place, as shown in Fig. 1, by a bolt or screw, A. As the nut $a$ is tightened by turning, the upper ends of the springs $b$ and $c$ are expanded, and the pressure of the spring is brought to bear directly at the point $d$ of the thill-coupling, where its operation is calculated to be the most effective. As the spring becomes weakened by being held for a considerable length of time in the same position, such weakening can be compensated for by simply screwing up the nut $a$ on the bolt A; or, if the pressure is too great, the spring may be loosened by unscrewing the nut $a$.

Figure 2:
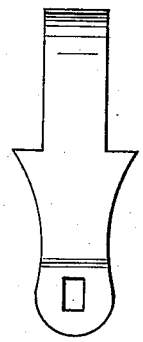

The illustration Fig. 1 represents my anti-rattler device as applied to wagon thills, poles, or shafts, B being the axle-clip; C, the shaft or thill; A', the spring in place and operating. Fig. 2 represents one-half of the spring as cut from suitable metal.

Having thus described my invention, what I claim as new, and desire to secure by Letters Patent, is—

1. In a thill-coupling, the combination of the clips, the shaft-irons, outwardly-extending curved springs, and suitable means for adjusting the said springs, substantially as and for the purpose set forth.

2. The combination of the curved spring A', the regulating screw or bolt A, clip B, and shaft-iron $e$, all constructed, arranged, and operating as shown in Fig. 1, and in the manner described.

In testimony whereof I have hereunto subscribed my name.

FRANK D. KERNOCHAN.

Witnesses:
H. H. MORSE,
ED. W. CHAMBERLAIN.